United States Patent [19]
Hiromoto et al.

[11] Patent Number: 5,610,235
[45] Date of Patent: Mar. 11, 1997

[54] HIGH GLOSS GRAFT COPOLYMER BLEND CONTAINING EMULSION GRAFT COPOLYMER AND BULK GRAFT COPOLYMER

[75] Inventors: Yasuyuki Hiromoto, Ube, Japan; Satish K. Gaggar, Parkersburg; Vijaya K. Kuruganti, Washington, both of W. Va.

[73] Assignee: General Electric Company, Pittsfield, Mass.

[21] Appl. No.: 514,045

[22] Filed: Aug. 11, 1995

[51] Int. Cl.$^6$ .................................................. C08G 63/48
[52] U.S. Cl. ................................................. 525/71; 525/70
[58] Field of Search ............................................ 525/70, 71

[56] References Cited

U.S. PATENT DOCUMENTS

| | | | |
|---|---|---|---|
| 3,928,494 | 12/1975 | Aliberti | 260/876 |
| 4,250,271 | 2/1981 | Morris et al. | 525/66 |
| 4,713,420 | 12/1987 | Henton | 525/236 |
| 4,785,051 | 11/1988 | Henton | 525/71 |
| 4,874,815 | 11/1989 | Bubeck et al. | 525/71 |
| 4,895,898 | 1/1990 | Kress et al. | 525/67 |
| 5,041,498 | 8/1991 | Hare et al. | 525/71 |

*Primary Examiner*—Edward J. Cain

[57] ABSTRACT

A thermoplastic composition is provided which exhibits the combined properties of high gloss, reduced viscosity, desirable levels of dart impact strength and reduced levels of opacity. The compositions contain respective amounts of a bulk vinyl aromatic-vinyl cyanide-rubber graft copolymer, an emulsion vinyl aromatic-vinyl cyanide-rubber graft copolymer, a high molecular weight vinyl aromatic-vinyl cyanide rigid copolymer, and a low molecular weight vinyl aromatic-vinyl cyanide rigid copolymer. The emulsion graft copolymer utilizes as the rubber a vinyl aromatic-diene rubber. The thermoplastic compositions are useful for making molded articles exhibiting high gloss and desired levels of dart impact strength and opacity.

17 Claims, No Drawings

HIGH GLOSS GRAFT COPOLYMER BLEND CONTAINING EMULSION GRAFT COPOLYMER AND BULK GRAFT COPOLYMER

BACKGROUND OF THE INVENTION

1. Field of the Invention

The present invention relates to thermoplastic compositions, and more particularly relates to thermoplastic compositions containing a blend of bulk graft copolymer and emulsion graft copolymer.

2. Description of the Related Art

Graft copolymer blends, specifically acrylonitrile-styrene-butadiene rubber copolymer blends containing bimodal or trimodal particles size distributions have utilized large rubber particle sizes produced in bulk polymerized graft copolymers, and have generally exhibited enhanced impact strengths, but have also exhibited reduced gloss. Additionally, blends of bulk acrylonitrile-butadiene-styrene graft copolymers and emulsion acrylonitrile-butadiene-styrene graft copolymers have been made, but have generally exhibited either reduced gloss levels and/or undesirably high levels of viscosity. Additionally, resins utilizing as the emulsion graft copolymer a rubber which is a homopolymer of butadiene, have generally exhibited relatively high levels of opacity.

Accordingly, there is a need to provide thermoplastic compositions which contain a blend of bulk graft copolymer and emulsion graft copolymer, which exhibit reduced levels of viscosity and reduced levels of opacity while exhibiting desirable levels of impact strength and further exhibiting high levels of gloss.

SUMMARY OF THE INVENTION

A thermoplastic composition is provided which exhibits low levels of viscosity and reduced levels of opacity while also exhibiting high gloss and desired levels of dart impact strength. The thermoplastic compositions contain respective amounts of a bulk vinyl aromatic-vinyl cyanide-rubber graft copolymer, an emulsion vinyl aromatic-vinyl cyanide-rubber graft copolymer, a high molecular weight rigid vinyl aromatic-vinyl cyanide copolymer and a low molecular weight vinyl aromatic-vinyl cyanide rigid copolymer. The emulsion graft copolymer utilizes a rubber which is a vinyl aromatic-diene rubber. The emulsion graft copolymer and the bulk graft copolymer are preferably in respective weight ratios of between 1.5:1 and 1.1:1.

DETAILED DESCRIPTION OF THE INVENTION

The thermoplastic compositions of the present invention exhibit high gloss even though a relatively high level of emulsion vinyl aromatic-vinyl cyanide-rubber graft copolymer containing a high level of rubber is employed. The thermoplastic compositions preferably contain the emulsion graft copolymer at a level of from 25 to 55 percent by weight based on the total weight of the composition, more preferably between 30 and 50 percent by weight based on the total weight of the composition, most preferably present at a level of from 35 to 45 percent by weight based on the total weight of the composition. The bulk graft copolymer is preferably present in the composition at a level of from 15 to 75 percent by weight based on the total weight of the composition, more preferably between 20 and 40 percent by weight based on the total weight of the composition, most preferably present at a level of from 25 to 35 percent by weight based on the total weight of the composition. Preferably the emulsion graft copolymer and the bulk graft copolymer are present in a respective weight ratio of between 1.5:1 and 1.1:1, and more preferably between 1.4:1 and 1.2:1, and most preferably about 1.3:1. The thermoplastic composition preferably contains the high molecular weight vinyl aromatic-vinyl cyanide rigid copolymer at a level of from 5 to 50 percent by weight based on the total weight of the composition, more preferably between 10 and 20 percent by weight based on the total weight of the composition, and most preferably between 5 and 15 percent by weight based on the total weight of the composition. The low molecular weight vinyl aromatic-vinyl cyanide rigid copolymer is preferably present at a level of from 2 to 30 percent by weight based on the total weight of the composition, more preferably between 10 and 25 percent by weight based on the total weight of the composition, most preferably between 15 and 20 percent by weight based on the total weight of the composition.

The emulsion graft copolymer comprises (i) the vinyl aromatic-diene rubber substrate, and (ii) a vinyl aromatic-vinyl cyanide rigid polymeric superstrate portion grafted to the rubber substrate wherein the superstrate. The rubber substrate is preferably present in the graft copolymer at a level of from 15 to 85 percent by weight (for example, 40 to 80 percent by weight) based on the total weight of the graft copolymer, more preferably from 25 to 60 percent by weight thereof, and most preferably 40 to 50 percent by weight thereof; and the rigid superstrate is preferably present at a level of from 15 to 85 percent by weight (for example, 20 to 60 percent by weight) based on the total weight of the graft copolymer, more preferably from 40 to 75 percent by weight thereof, and most preferably from 50 to 60 percent by weight thereof.

Examples of rubbery polymers for the substrate of the bulk graft copolymer include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri-(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents. The rubbery polymers for the substrate of the emulsion graft copolymer are the above vinyl aromatic-diene copolymer rubbers.

The diene rubbers may preferably be polybutadiene, polyisoprene and copolymers of butadiene with up to 35% by weight (for example, up to 5% by weight) of comonomers such as styrene, acrylonitrile, methylmethacrylate or $C_1$–$C_6$-alkylacrylate which are produced by aqueous radical emulsion polymerization. The acrylate rubbers may be crosslinked, particulate emulsion copolymers substantially of $C_1$–$C_8$-alkylacrylate, in particular $C_2$–$C_6$-alkylacrylate, optionally in admixture with up to 15% by weight (for example, up to 5% by weight) of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

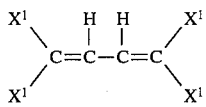

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used for the emulsion graft copolymer in this invention as measured by simple light transmission methods or capillary hydrodynamic chromatography (CHDF) may be described as having an average particle size by weight of 0.05 to 0.2 microns, preferably 0.08 to 0.15 microns based on a volume average, for the emulsion based polymerized rubber latices. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and acrylonitrile-methylmethacrylate-vinyl aromatic copolymers. Specific examples of high rubber graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

Vinyl aromatic monomers which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidenearomatic monomers utilized are generically described by the following formula:

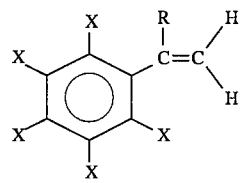

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth)acrylates or mixtures thereof. The acrylonitrile, substituted acrylonitrile, or acrylic acid esters are described generically by the following formula:

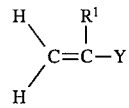

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The ungrafted rigid vinyl aromatic-vinyl cyanide copolymers are known and may be prepared by radical polymerisation, in particular by emulsion, suspension, solution or bulk polymerisation.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40 more preferably 79/21 to 75/25. The third monomer may optional replace 0 to 50% of one or both of the first and second monomers.

The rubber substrate of the emulsion rubber graft copolymer preferably has an average particle size of from 0.05 to 0.2 microns, preferably from 0.08 to 0.15 microns based on a volume average. The rubber of the emulsion graft copolymer is a vinyl aromatic-diene rubber as set out above.

A low rubber graft copolymer (bulk vinyl aromatic-vinyl cyanide-rubber graft copolymer) is obtained by bulk polymerization of vinyl aromatic monomer and vinyl cyanide monomer in the presence of a rubbery substrate. The bulk graft copolymer preferably contains from 5 to 25 percent by weight rubber based on the total weight of the bulk graft copolymer, more preferably contains from 10 to 15 percent by weight thereof, and most preferably contains about 12 percent by weight thereof. The bulk graft copolymer further contains a superstrate which is grafted to the rubbery substrate thereof, and the superstrate is preferably present at a level of from 75 to 95 percent by weight based on the total weight of the bulk graft copolymer, more preferably present at a level of from 85 to 90 percent by weight thereof, and most preferably is present at a level of about 88 percent by weight thereof. The superstrate of the lower graft copolymer preferably contains from 22 to 28 percent by weight vinyl cyanide monomer, more preferably from 23 to 27 percent by weight thereof, and most preferably 25 percent by weight thereof; and contains the vinyl aromatic monomer at a level of from 72 to 78 percent by weight based on the total weight of the superstrate, more preferably 73 to 77 percent by weight thereof, and more preferably about 75 percent by weight thereof. The rubbery substrate is preferably in the form of particles having an average particle size (weight average) of from 0.5 to 5 microns, and more preferably from 0.8 to 2.0 microns, for the bulk graft copolymer. As mentioned above, the high rubber graft copolymer is obtained by emulsion polymerization, and the bulk graft copolymer is obtained by bulk (or bulk-suspension) polymerization.

The composition preferably has a total rubber content of between 5 and 30 percent by weight based on the total weight of the composition, more preferably between 10 and 25 percent by weight thereof, and most preferably about 20 percent by weight thereof.

The emulsion graft copolymer of the present invention utilizes a vinyl aromatic-diene rubber which allows for reduced levels of opacity.

The high molecular weight vinyl aromatic-vinyl cyanide rigid copolymer preferably contains in combination at least 95 percent by weight vinyl aromatic monomer and vinyl cyanide monomer based on the total weight of the high molecular weight rigid copolymer. In other words, the high molecular weight rigid copolymer may contain up to 5 percent of an additional monomer such as an alkyl arcylate or other suitable vinyl monomer. The high molecular weight vinyl aromatic-vinyl cyanide copolymer preferably has a weight average molecular weight of between 100,000 and 300,000, more preferably between 110,000 and 130,000, most preferably between 115,000 and 120,000. The high molecular weight vinyl aromatic-vinyl cyanide rigid copolymer preferably has a number average molecular weight of between 35,000 and 150,000, more preferably between 38,000 and 100,000, most preferably between 40,000 and 60,000.

The low molecular weight vinyl aromatic-vinyl cyanide rigid copolymer preferably has a weight average molecular weight of between 30,000 and 80,000, more preferably between 40,000 and 70,000, and most preferably between 60,000 and 65,000. The low molecular weight vinyl aromatic-vinyl cyanide rigid copolymer preferably has a number average molecular weight of between 10,000 and 30,000, more preferably between 15,000 and 28,000, and most preferably between 20,000 and 25,000.

Most preferably the bulk graft copolymer is an acrylonitrile-styrene-butadiene rubber graft copolymer. Most preferably the emulsion graft copolymer is an acrylonitrile-styrene-(styrene butadiene) rubber graft copolymer. Most preferably the high molecular weight vinyl aromatic-vinyl cyanide rigid copolymer is a high molecular weight styrene-acrylonitrile copolymer. Most preferably the low molecular weight vinyl aromatic-vinyl cyanide rigid copolymer is a low molecular weight styrene-acrylonitrile rigid copolymer.

Preferably the thermoplastic compositions have a gloss level as measured by ASTM D523-80, of at least 90 units, and most preferably at least 95 units. Preferably the thermoplastic compositions have a dart impact strength of at least 15 R/lbs, more preferably at least 20 ft/lbs, most preferably at least 25 R/lbs. Preferably the thermoplastic composition has a viscosity as measured in poise at 232° C. at a shear rate of 100/S, of less than 10000, more preferably less than 9500, most preferably less than 8500. The thermoplastic compositions preferably have a percent opacity of less than 75 percent, more preferably less than 70 percent, and most preferably less than 68 percent. Reduced opacity allows for the utilization of reduced levels of pigment while still achieving the desired degree of coloration. In other words, the present compositions may further contain desired levels of pigments and/or dyes, generally referred to in combination or collectively as colorants at reduced levels while achieving the same desired level of coloration. In other words, the present compositions are especially useful in situations involving colored compositions. Suitable colorants include, for example, blue dyes, red dyes and green dyes among others.

EXAMPLES

Preparation of Materials (Bulk ABS)

In preparing the compositions for the experiments, two different types of bulk ABS: BABS1 (uses SBR rubber) and BABS2 (uses PBD rubber) are produced by a continuous bulk polymerization.

|  | BABS 1 | BABS 2 |
| --- | --- | --- |
| Rubber type | SBR | PBD |
|  | (Stereon 721) | (Diene 55) |
| Total rubber content (%) | 12.0 | 12.0 |
|  | Dv(μ) = 1.46 | Dv(μ) = 1.26 |
|  | Dn(μ) = 0.73 | Dn(μ) = 0.65 |

*Stereon 721 (ST/PBD) and Diene 55 are available from the Firestone Synthetis Rubber.

In order to obtain a high rubber graft (HRG) having a small particle based on SBR, three HRG's polymerization were carried out. The formula are as follows:

Formula: as parts on active basis

| Reaction Materials | Act. (%) | HRG-1 | HRG-2 | HRG-3 |
| --- | --- | --- | --- | --- |
| Water | 100 | 160 | 160 | 160 |
| SBR (0.09μ) |  | 50 | 45 | 40 |
| Water | 100 | 3.0 | 3.0 | 3.0 |
| Cerelose | 100 | 0.3 | 0.3 | 0.3 |
| Water | 100 | 7.0 | 7.0 | 7.0 |
| TSPP | 100 | 0.03 | 0.03 | 0.03 |
| FeSO4.7H2O | 100 | 0.002 | 0.002 | 0.002 |
| ST | 100 | 37 | 41 | 45 |
| AN | 100 | 13 | 16 | 15 |
| CHP | 84.5 | 0.4 | 0.4 | 0.4 |
| t-DDM | 100 | 0.4 | 0.4 | 0.4 |

*TSPP: Tebra Sodium pyrophosphate
*FeSO4.7H20: Iron sulfate
*ST: Styrene
*AN: Acrylonitrile
*CHP: Cumen hydroperoxide
*t-DDM: t-dodecyl mercaptan In the emulsion polymerization process, the reactor was charged with a soap solution, heated to 58° C. and agitated throughout the polymerization process. In addition, a cerelose and Fe solution was charged. Two feed streams (one is for CHP, another is for monomer and t-DDM) was continuously added to the reactor for 70 minutes. The polymerization was carried out under the following temperature profile. 58° C.: 0–30 min. 60° C.: 30–40 min. 63° C.: 40–70 min. 71° C.: 70–130 min. After the reaction, as well-known in the art, the slurry with AOE (Antioxidant emulsion) was coagulated and dried.

Two different types of polySAN copolymer were prepared by bulk and suspension polymerization to control the flow/impact balance of blend.

|  | AN | ST | Mw | Mn |
|---|---|---|---|---|
| PSAN-1 | 25 | 75 | 118000 | 43000 |
| PSAN-2 | 25 | 75 | 63500 | 24000 |

*PSAN-1 is a bulk SAN product.
*PSAN-2 is a suspension SAN product.

Compounding and Molding of the Blends

The desired components were blended with EBS-wax and compounded in the Bunbury. The molding was carried out by 4 oz. injection molding machine at 260° C. stock temperature. * EBS-wax: N,N'-ethylene bis-stearamide

Physical Properties Testing

The blends were measured for the following physical properties.

| Izod impact (ft-lb/in): | ASTM D-256-70 |
|---|---|
| Dart impact (ft-lb): | A dart of a half inch diameter was used. The dart was driven at a constant speed of 11 ft/second. |
| Viscosity (poise): | Capillary viscometer at 232° C., The viscosity was calculated at 100/sec., 500/sec. and 1000/sec. of the shear rate. |
| Opacity (%): | HUNTERLAB MODEL LABSCAN-2 from Hunter Associates Laboratory Used ⅛" plague |
| Gloss: | 60° gloss by Hunterlab Model Labscan - 2 |

Samples A–O are comparative examples. Examples 1–3 illustrate the present invention.

TABLE 1

| Blend product No. | A | B | C | D | E | F | G | H |
|---|---|---|---|---|---|---|---|---|
| Materials |  |  |  |  |  |  |  |  |
| BABS 1 (SBR) | 30 | 30 | 30 |  |  |  |  |  |
| BABS 2 (PBD) |  |  |  | 30 | 30 | 30 | 100 |  |
| HRG-1 | 24 |  |  | 24 |  |  |  |  |
| HRG-2 |  | 28 |  |  | 28 |  |  |  |
| HRG-3 |  |  | 31 |  |  | 31 |  | 57 |
| PSAN-1 | 46 | 42 | 39 | 46 | 42 | 39 |  | 43 |
| EBS-wax | 1.0 | 1.0 | 1.0 | 1.0 | 1.0 | 1.0 | 1.0 | 1.0 |
| Total rubber content (%) | 16.0 | 16.0 | 16.0 | 16.0 | 16.0 | 16.0 | 12.0 | 22.8 |
| Izod impact (ft-lb/in) | 3.1 | 2.1 | 2.1 | 3.6 | 2.3 | 2.3 | 2.6 | 0.4 |
| Dart impact (ft-lb) | 28 | 28 | 31 | 29 | 29 | 31 | 26 | 0.5 |
| Capillary viscosity 232° C. (poise) |  |  |  |  |  |  |  |  |
| 100/s | 7415 | 7197 | 7280 | 7943 | 7881 | 7995 | 10325 | 12147 |
| 500/s | 3100 | 3017 | 3082 | 3221 | 3169 | 3196 | 3686 | 4318 |
| 1000/s | 2007 | 1974 | 1995 | 2082 | 2079 | 2069 | 2342 | 2682 |
| Opacity (%) | 71.3 | 65.4 | 66.0 | 71.8 | 68.0 | 68.9 | 78.5 | 60.9 |
| Gloss | 90 | 90 | 91 | 87 | 90 | 90 | 73 | 77 |

TABLE 2

| Blend product no. | I | J | K | L | M | N |
|---|---|---|---|---|---|---|
| Materials |  |  |  |  |  |  |
| BABS 2 | 100 | 30 | 20 | 10 | 5 |  |
| HRG-3 |  | 40 | 45.7 | 51.4 | 54.2 | 57 |
| PSAN-1 |  | 30 | 34.3 | 38.6 | 40.8 | 43 |
| EBS-wax | 1.0 | 1.0 | 1.0 | 1.0 | 1.0 | 1.0 |
| Total rubber content (%) | 12.0 | 19.6 | 20.7 | 21.8 | 22.3 | 22.8 |
| Izod impact (ft-lb/in) | 2.6 | 6.1 | 4.3 | 1.1 | 0.7 | 0.4 |
| Dart impact (ft-lb) | 26 | 31 | 28 | 24 | 18 | 0.5 |
| Capillary viscosity 232° C. (poise) |  |  |  |  |  |  |
| 100/s | 10325 | 10780 | 11733 | 12127 | 12251 | 12147 |
| 500/s | 3686 | 3992 | 4112 | 4106 | 4164 | 4318 |
| 1000/s | 2342 | 2475 | 2532 | 2497 | 2575 | 2628 |
| Opacity (%) | 78.5 | 68.6 | 65.9 | 63.4 | 62.1 | 60.9 |
| Gloss | 73 | 94 | 95 | 95 | 96 | 97 |

TABLE 3

| Blend product No. | 0 | 1 | 2 | 3 |
|---|---|---|---|---|
| Materials | | | | |
| BABS 2 | 30 | 30 | 30 | 30 |
| HRG-3 | 40 | 40 | 40 | 40 |
| PSAN-1 | 30 | 20 | 10 | 5 |
| PSAN-2 | | 10 | 20 | 25 |
| EBS-wax | 1.0 | 1.0 | 1.0 | 1.0 |
| Total rubber content (%) | 19.6 | 19.6 | 19.6 | 19.6 |
| Izod impact (ft-lb/in) | 6.1 | 5.6 | 5.1 | 4.7 |
| Dart impact (ft-lb) | 31 | 29 | 30 | 27 |
| Capillary viscosity 232° C. (poise) | | | | |
| 100/s | 10780 | 9403 | 8419 | 8233 |
| 500/s | 3992 | 3616 | 3258 | 3304 |
| 1000/s | 2475 | 2307 | 2121 | 2145 |
| Opacity (%) | 68.6 | 67.2 | 66.5 | 66.4 |
| Gloss | 94 | 94 | 95 | 95 |

We claim:

1. A high gloss thermoplastic composition comprising:

(a) an emulsion vinyl aromatic-vinyl cyanide-rubber graft copolymer present at a level of from 25 to 55 percent by weight based on the total weight of the composition, said emulsion graft copolymer having a rubber level of from 40 to 85 percent by weight based on the total weight of the emulsion graft copolymer, said rubber being a vinyl aromatic-diene rubber, (b) a bulk vinyl aromatic-vinyl cyanide-rubber graft copolymer present at a level of from 15 to 45 percent by weight based on the total weight of the composition, said bulk graft copolymer having a rubber level of from 5 to 25 percent by weight based on the total weight of the bulk graft copolymer, wherein the respective weight ratio of emulsion graft copolymer to bulk graft copolymer is between 2:1 and 1:1, (c) a high molecular weight vinyl aromatic-vinyl cyanide rigid copolymer having a weight average molecular weight of from 90,000 to 300,000, (d) a low molecular weight vinyl aromatic-vinyl cyanide rigid copolymer having a weight average molecular weight of from 30,000 to 80,000.

2. The composition of claim 1 wherein said composition has an opacity of less than 70%.

3. The composition of claim 1 wherein said composition has a viscosity of less than 10000 poise as measured at 232° at a shear rate of 100/s.

4. The composition of claim 1 wherein said emulsion graft copolymer is present at a level of from 30 to 50 percent by weight based on the total weight of the composition.

5. The composition of claim 1 wherein said emulsion graft copolymer is present at a level of from 35 to 45 percent by weight based on the total weight of the composition.

6. The composition of claim 1 wherein said bulk graft copolymer is present at a level of from 20 to 40 percent by weight based on the total weight of the composition.

7. The composition of claim 1 wherein said bulk graft copolymer is present at a level of from 25 to 35 percent by weight based on the total weight of the composition.

8. The composition of claim 1 wherein said high molecular weight rigid copolymer is present at a level of from 5 to 20 percent by weight based on the total weight of the composition, and said low molecular weight rigid copolymer being present at a level of from 10 to 25 percent by weight based on the total weight of the composition.

9. The composition of claim 1 wherein said high molecular weight rigid copolymer is present at a level of from 7 to 15 percent by weight based on the total weight of the composition, and said low molecular weight rigid copolymer being present at a level of from 15 to 24 percent by weight based on the total weight of the composition.

10. The composition of claim 1 wherein said high molecular weight rigid copolymer is present at a level of from 8 to 12 percent by weight based on the total weight of the composition, and said low molecular weight rigid copolymer being present at a level of from 18 to 22 percent by weight based on the total weight of the composition.

11. The composition of claim 1 wherein said bulk graft copolymer and said emulsion graft copolymer are in a respective weight ratio of between 1.4:1 and 1.2:1.

12. The composition of claim 1 consisting essentially of said emulsion graft copolymer, bulk graft copolymer, high molecular weight rigid copolymer and low molecular weight rigid copolymer.

13. The composition of claim 1 consisting of said emulsion graft copolymer, bulk graft copolymer, high molecular weight rigid copolymer and low molecular weight rigid copolymer.

14. The composition of claim 1 wherein said high molecular weight rigid copolymer has a weight average molecular weight of from 100,000 to 130,000, and said low molecular weight rigid copolymer has a weight average molecular weight of from 40,000 to 70,000.

15. The composition of claim 1 wherein said high molecular weight rigid copolymer has a weight average molecular weight of from 110,000 to 120,000, and said low molecular weight rigid copolymer has a weight average molecular weight of from 60,000 to 65,000.

16. The composition of claim 1 wherein said emulsion graft copolymer has a rubber particle size of 0.05 to 0.2 microns based on a volume average.

17. The composition of claim 16 wherein said bulk graft copolymer has a rubber particle size of between 0.5 and 5 microns based on a weight average.

* * * * *